(12) United States Patent
Zhang et al.

(10) Patent No.: US 9,577,726 B2
(45) Date of Patent: Feb. 21, 2017

(54) METHOD, APPARATUS, AND SYSTEM FOR SENDING DATA IN HYBRID NETWORKING

(71) Applicant: Huawei Technologies Co., Ltd., Shenzhen (CN)

(72) Inventors: Peng Zhang, Shanghai (CN); Xueli Ma, Shenzhen (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 14/858,853

(22) Filed: Sep. 18, 2015

(65) Prior Publication Data
US 2016/0013843 A1    Jan. 14, 2016

Related U.S. Application Data

(63) Continuation of application No. PCT/CN2013/072920, filed on Mar. 20, 2013.

(51) Int. Cl.
*H04B 7/02* (2006.01)
*H04B 7/04* (2006.01)
(Continued)

(52) U.S. Cl.
CPC ......... *H04B 7/0426* (2013.01); *H04B 7/0456* (2013.01); *H04B 7/0465* (2013.01);
(Continued)

(58) Field of Classification Search
CPC ... H04B 1/38; H04B 7/00; H04B 7/02; H04B 7/04; H04B 7/0426; H04B 7/04456;
(Continued)

(56) References Cited

U.S. PATENT DOCUMENTS 7,583,747 B1 * 9/2009 Damen ............... H04B 7/0669
                                                      375/219
2011/0077019 A1 * 3/2011 De Pasquale ....... H04B 7/0413
                                                      455/452.2
(Continued)

FOREIGN PATENT DOCUMENTS

CN       101465681 A       6/2009
CN       101631380 A       1/2010
(Continued)

OTHER PUBLICATIONS

Ericsson, "Introduction of S-CPICH Power Offset Test," 3GPP TSG-RAN WG4 Meeting #60, R4-114334, Change Request, Aug. 22-26, 2011, 8 pages.
(Continued)

*Primary Examiner* — Shawkat M Ali
(74) *Attorney, Agent, or Firm* — Slater Matsil, LLP

(57) ABSTRACT

Embodiments of the present invention provide a method, an apparatus, and a system for sending data in hybrid networking. The method includes: determining an order quantity N of highest-order MIMO data and a quantity M of data types in the hybrid networking, where N is an even number not less than 2, and M is a natural number not less than 2; performing $i^{th}$ linear transformation processing on $i^{th}$-type data among the M types of data, to obtain N pieces of $i^{th}$-type output data having a same power, where i is a natural number less than or equal to M; and respectively outputting the N pieces of $i^{th}$-type output data having a same power to N physical antennas, so that each physical antenna combines output data received by the physical antenna and then sends data obtained after the combining.

20 Claims, 6 Drawing Sheets

(51) Int. Cl.
*H04W 52/04* (2009.01)
*H04W 52/42* (2009.01)

(52) U.S. Cl.
CPC .......... *H04B 7/0473* (2013.01); *H04W 52/04* (2013.01); *H04W 52/42* (2013.01)

(58) Field of Classification Search
CPC .... H04B 7/06; H04L 1/00; H04L 1/02; H04L 27/00; H04L 27/28; H04W 4/00; H04W 24/00; H04W 28/16; H04W 52/24; H04W 52/42; H04W 72/04; H04W 74/04
USPC ........ 370/328, 329, 252; 375/219, 260, 267, 375/295; 714/795
See application file for complete search history.

(56) References Cited

U.S. PATENT DOCUMENTS

| | | | | |
|---|---|---|---|---|
| 2011/0116563 | A1* | 5/2011 | Vitthaladevuni | H04L 1/0001 375/260 |
| 2011/0243007 | A1 | 10/2011 | Xiao | |
| 2011/0263281 | A1* | 10/2011 | Cai | H04B 7/0404 455/501 |
| 2012/0033755 | A1* | 2/2012 | Ringstrom | H04B 7/0426 375/267 |
| 2012/0113840 | A1* | 5/2012 | Le Pezennec | H04B 7/0417 370/252 |
| 2012/0120895 | A1* | 5/2012 | Wang | H04W 28/10 370/329 |
| 2012/0177089 | A1* | 7/2012 | Pelletier | H04B 7/0417 375/219 |
| 2012/0201319 | A1* | 8/2012 | Asplund | H04B 7/0413 375/267 |
| 2012/0320869 | A1 | 12/2012 | Stadelmeier et al. | |
| 2013/0100997 | A1 | 4/2013 | Wang et al. | |
| 2013/0215992 | A1* | 8/2013 | Kazmi | H04B 7/0413 375/295 |
| 2014/0169490 | A1* | 6/2014 | Medbo | H04W 52/241 375/267 |

FOREIGN PATENT DOCUMENTS

| | | |
|---|---|---|
| CN | 101815321 A | 8/2010 |
| CN | 101854712 A | 10/2010 |
| CN | 102763463 A | 10/2012 |
| EP | 2640125 A1 | 9/2013 |
| WO | 2012062056 A1 | 5/2012 |
| WO | 2012062141 A1 | 5/2012 |
| WO | 2013068135 A1 | 5/2013 |

OTHER PUBLICATIONS

Nokia Siemens Networks, "Integrating Power Balancing Network into 4Tx MIMO," 3GPP TSG RAN WG1 Meeting #67, R1-120652, Feb. 6-10, 2011, 4 pages.

* cited by examiner

METHOD, APPARATUS, AND SYSTEM FOR SENDING DATA IN HYBRID NETWORKING

This application is a continuation of International Patent Application No. PCT/CN2013/072920 filed on Mar. 20, 2013, which is hereby incorporated by reference in the entirety.

TECHNICAL FIELD

The present invention relates to the field of mobile communications, and in particular, to a method, an apparatus, and a system for sending data in hybrid networking.

BACKGROUND

A multiple-input multiple-output (MIMO) system uses multiple transmit antennas and multiple receive antennas respectively at a transmit end and a receive end, and signals are transmitted and received by means of multiple antennas at the transmit end and the receive end, thereby improving service quality for every user. Although the MIMO technology is applied increasingly widely, a conventional single-input single-output (SISO) technology is still in use. Therefore, a hybrid networking architecture including a current MIMO system and a conventional single-output system is also in wide application.

However, in a hybrid networking architecture including a MIMO system and a conventional single-output system, because a transmit power of the MIMO system is different from that of the conventional single-output system, powers of physical antennas are imbalanced, and as a result, optimal performance of MIMO cannot be achieved.

SUMMARY

Embodiments of the present invention provide a method, an apparatus, and a system for sending data in hybrid networking, so as to implement power balancing among physical antennas in hybrid networking and improve performance of data sending in hybrid networking.

According to a first aspect, an embodiment of the present invention provides a method for sending data in hybrid networking, where the method includes determining an order quantity N of highest-order multiple-input multiple-output (MIMO) data in hybrid networking and a quantity M of data types in the hybrid networking, where N is an even number not less than 2, and M is a natural number not less than 2; performing $i^{th}$ linear transformation processing on $i^{th}$-type data among the M types of data, to obtain N pieces of $i^{th}$-type output data having a same power, where i is a natural number less than or equal to M; and respectively outputting the N pieces of $i^{th}$-type output data having a same power to N physical antennas, so that each physical antenna combines output data received by the physical antenna and then sends data obtained after the combining.

In a first possible implementation manner, when the $i^{th}$-type data includes non-MIMO user data, before the performing $i^{th}$ linear transformation processing on the $i^{th}$-type data, the method further includes: combining the non-MIMO user data and first-type pilot information, to obtain non-MIMO data, where the first-type pilot information is a primary common pilot channel P-CPICH, and the first-type pilot information is used by the terminal to perform channel estimation and demodulate the non-MIMO data; and the performing $i^{th}$ linear transformation processing on $i^{th}$-type data includes: performing corresponding linear transformation processing on the non-MIMO data obtained after the combining, to obtain N pieces of non-MIMO output data having a same power.

With reference to the first aspect, in a second possible implementation manner, when the $i^{th}$-type data includes MIMO user data, before the performing $i^{th}$ linear transformation processing on the $i^{th}$-type data, the method further includes: performing precoding processing on the MIMO user data, to obtain encoded MIMO user data, or performing precoding processing on the MIMO user data and third-type pilot information, to obtain encoded MIMO user data; and combining the encoded MIMO user data, second-type pilot information, and the third-type pilot information, to obtain MIMO data, where the second-type pilot information is channel estimation pilot information used by the terminal to perform channel estimation, and the third-type pilot information is data demodulation pilot information used by the terminal to demodulate the MIMO user data; and the performing $i^{th}$ linear transformation processing on $i^{th}$-type data includes: performing corresponding linear transformation processing on the MIMO data, to obtain N pieces of MIMO output data having a same power.

With reference to the second possible implementation manner of the first aspect, in a third possible implementation manner, a quantity of pieces of second-type pilot information is the same as an order quantity of the $i^{th}$-type data, and a quantity of pieces of third-type pilot information is the same as the order quantity of the $i^{th}$-type data.

With reference to the first aspect, in a fourth possible implementation manner, when M is 2, the performing $i^{th}$ linear transformation processing on $i^{th}$-type data to obtain N pieces of $i^{th}$-type output data having a same power includes: performing first linear transformation processing on first-type data, to obtain N pieces of first-type output data having a same power; and performing second linear transformation processing on second-type data, to obtain N pieces of second-type output data having a same power.

With reference to the first aspect, in a fifth possible implementation manner, when M is 3, the performing $i^{th}$ linear transformation processing on $i^{th}$-type data to obtain N pieces of $i^{th}$-type output data having a same power is specifically: performing first linear transformation processing on first-type data, to obtain N pieces of first-type output data having a same power; performing second linear transformation processing on second-type data, to obtain N pieces of second-type output data having a same power; and performing third linear transformation processing on third-type data, to obtain N pieces of third-type output data having a same power.

With reference to the first aspect, in a sixth possible implementation manner, when M is 3, the performing $i^{th}$ linear transformation processing on $i^{th}$-type data to obtain N pieces of $i^{th}$-type output data having a same power includes: performing first linear transformation processing on first-type data, to obtain P pieces of first-type output data having a same power, where P is an order quantity of second-type data; performing second linear transformation processing on the second-type data, to obtain P pieces of second-type output data having a same power; combining the P pieces of first-type output data having a same power and the P pieces of second-type output data having a same power, and performing fourth linear transformation processing, to obtain N pieces of first hybrid output data having a same power; and performing third linear transformation processing on third-type data, to obtain N pieces of third-type output data having a same power.

With reference to the sixth possible implementation manner of the first aspect, in a seventh possible implementation manner, the respectively outputting M groups of N pieces of $i^{th}$-type output data having a same power to N physical antennas includes: outputting the N pieces of first hybrid output data having a same power to the N physical antennas, and outputting the N pieces of third-type output data having a same power to the N physical antennas.

According to a second aspect, an embodiment of the present invention provides an apparatus for sending data in hybrid networking, where the apparatus includes a determining unit, configured to determine an order quantity N of highest-order multiple-input multiple-output (MIMO) data in hybrid networking and a quantity M of data types in the hybrid networking, where N is an even number not less than 2, and M is a natural number not less than 2, and transmit N and M to a processing unit; the processing unit, configured to perform $i^{th}$ linear transformation processing on $i^{th}$-type data among the M types of data, to obtain N pieces of $i^{th}$-type output data having a same power, where i is a natural number less than or equal to M, and transmit the N pieces of $i^{th}$-type output data having a same power to a transmitting unit; and the transmitting unit, configured to respectively output the N pieces of $i^{th}$-type output data having a same power to N physical antennas, so that each physical antenna combines output data received by the physical antenna and then sends data obtained after the combining.

In a first possible implementation manner, the apparatus further includes: a first combining unit, configured to: when the $i^{th}$-type data includes non-MIMO user data, combine the non-MIMO user data and first-type pilot information, to obtain non-MIMO data, where the first-type pilot information is a primary common pilot channel P-CPICH, and the first-type pilot information is used by the terminal to perform channel estimation and demodulate the non-MIMO data; and the processing unit is specifically configured to perform corresponding linear transformation processing on the non-MIMO data obtained after the combining, to obtain N pieces of non-MIMO output data having a same power.

With reference to the second aspect, in a second possible implementation manner, the apparatus further includes: a precoding unit, configured to: when the $i^{th}$-type data includes MIMO user data, perform precoding processing on the MIMO user data, to obtain encoded MIMO user data, or perform precoding processing on the MIMO user data and third-type pilot information, to obtain the encoded MIMO user data; and a second combining unit, configured to combine the encoded MIMO user data, second-type pilot information, and the third-type pilot information, to obtain MIMO data, where the second-type pilot information is channel estimation pilot information used by the terminal to perform channel estimation, and the third-type pilot information is data demodulation pilot information used by the terminal to demodulate the MIMO user data; and the processing unit is specifically configured to perform corresponding linear transformation processing on the MIMO data, to obtain N pieces of MIMO output data having a same power.

With reference to the second possible implementation manner of the second aspect, in a third possible implementation manner, a quantity of pieces of second-type pilot information is the same as an order quantity of the $i^{th}$-type data, and a quantity of pieces of third-type pilot information is the same as the order quantity of the $i^{th}$-type data.

With reference to the second aspect, in a fourth possible implementation manner, when M is 2, the processing unit is configured to: perform first linear transformation processing on first-type data, to obtain N pieces of first-type output data having a same power; and perform second linear transformation processing on second-type data, to obtain N pieces of second-type output data having a same power.

With reference to the second aspect, in a fifth possible implementation manner, when M is 3, the processing unit is configured to: perform first linear transformation processing on first-type data, to obtain N pieces of first-type output data having a same power; perform second linear transformation processing on second-type data, to obtain N pieces of second-type output data having a same power; and perform third linear transformation processing on third-type data, to obtain N pieces of third-type output data having a same power.

With reference to the second aspect, in a sixth possible implementation manner, when M is 3, the processing unit is configured to: perform first linear transformation processing on first-type data, to obtain P pieces of first-type output data having a same power, where P is an order quantity of second-type data; perform second linear transformation processing on the second-type data, to obtain P pieces of second-type output data having a same power; combine the P pieces of first-type output data having a same power and the P pieces of second-type output data having a same power, and perform fourth linear transformation processing, to obtain N pieces of first hybrid output data having a same power; and perform third linear transformation processing on third-type data, to obtain N pieces of third-type output data having a same power.

With reference to the sixth possible implementation manner of the second aspect, in a seventh possible implementation manner, the transmitting unit is configured to: output the N pieces of first hybrid output data having a same power to the N physical antennas, and output the N pieces of third-type output data having a same power to the N physical antennas.

According to a third aspect, an embodiment of the present invention provides a network side device, where the network side device includes a processor; a network interface; a memory; and an application physically stored in the memory, where the application includes instructions that can be used to make the processor and the network side device execute the following processes: determining an order quantity N of highest-order multiple-input multiple-output (MIMO) data in hybrid networking and a quantity M of data types in the hybrid networking, where N is an even number not less than 2, and M is a natural number not less than 2; performing $i^{th}$ linear transformation processing on $i^{th}$-type data among the M types of data, to obtain N pieces of $i^{th}$-type output data having a same power, where i is a natural number less than or equal to M; and respectively outputting the N pieces of $i^{th}$-type output data having a same power to N physical antennas, so that each physical antenna combines output data received by the physical antenna and then sends data obtained after the combining.

In a first possible implementation manner, when the $i^{th}$-type data includes non-MIMO user data, the application can further make the processor and the network side device execute the following instruction: combining the non-MIMO user data and first-type pilot information, to obtain non-MIMO data, where the first-type pilot information is a primary common pilot channel P-CPICH, and the first-type pilot information is used by the terminal to perform channel estimation and demodulate the non-MIMO data; and the process executed by the processor of performing $i^{th}$ linear transformation processing on $i^{th}$-type data includes an instruction of: performing corresponding linear transformation processing on the non-MIMO data obtained after the combining, to obtain N pieces of non-MIMO output data having a same power.

With reference to the third aspect, in a second possible implementation manner, when the $i^{th}$-type data includes MIMO user data, the application can further make the processor and the network side device execute the following instructions: performing precoding processing on the MIMO user data, to obtain encoded MIMO user data, or performing precoding processing on the MIMO user data and third-type pilot information, to obtain the encoded MIMO user data; and combining the encoded MIMO user data, second-type pilot information, and the third-type pilot information, to obtain MIMO data, where the second-type pilot information is channel estimation pilot information used by the terminal to perform channel estimation, and the third-type pilot information is data demodulation pilot information used by the terminal to demodulate the MIMO user data; and the process executed by the processor of performing $i^{th}$ linear transformation processing on $i^{th}$-type data includes an instruction of: performing corresponding linear transformation processing on the MIMO data, to obtain N pieces of MIMO output data having a same power.

With reference to the second possible implementation manner of the third aspect, in a third possible implementation manner, a quantity of pieces of second-type pilot information is the same as an order quantity of the $i^{th}$-type data, and a quantity of pieces of third-type pilot information is the same as the order quantity of the $i^{th}$-type data.

With reference to the third aspect, in a fourth possible implementation manner, when M is 2, the process executed by the processor of performing $i^{th}$ linear transformation processing on $i^{th}$-type data to obtain N pieces of $i^{th}$-type output data having a same power includes the following instructions: performing first linear transformation processing on first-type data, to obtain N pieces of first-type output data having a same power; and performing second linear transformation processing on second-type data, to obtain N pieces of second-type output data having a same power.

With reference to the third aspect, in a fifth possible implementation manner, when M is 3, the process executed by the processor of performing $i^{th}$ linear transformation processing on $i^{th}$-type data to obtain N pieces of $i^{th}$-type output data having a same power includes the following instructions: performing first linear transformation processing on first-type data, to obtain N pieces of first-type output data having a same power; performing second linear transformation processing on second-type data, to obtain N pieces of second-type output data having a same power; and performing third linear transformation processing on third-type data, to obtain N pieces of third-type output data having a same power.

With reference to the third aspect, in a sixth possible implementation manner, when M is 3, the process executed by the processor of performing $i^{th}$ linear transformation processing on $i^{th}$-type data to obtain N pieces of $i^{th}$-type output data having a same power includes the following instructions: performing first linear transformation processing on first-type data, to obtain P pieces of first-type output data having a same power, where P is an order quantity of second-type data; performing second linear transformation processing on the second-type data, to obtain P pieces of second-type output data having a same power; combining the P pieces of first-type output data having a same power and the P pieces of second-type output data having a same power, and performing fourth linear transformation processing, to obtain N pieces of first hybrid output data having a same power; and performing third linear transformation processing on third-type data, to obtain N pieces of third-type output data having a same power.

With reference to the sixth possible implementation manner of the third aspect, in a seventh possible implementation manner, the process executed by the processor of respectively outputting M groups of N pieces of $i^{th}$-type output data having a same power to N physical antennas includes the following instructions: outputting the N pieces of first hybrid output data having a same power to the N physical antennas, and outputting the N pieces of third-type output data having a same power to the N physical antennas.

According to a fourth aspect, an embodiment of the present invention provides a system for sending data in hybrid networking, where the system includes the foregoing apparatus and a terminal.

According to a fifth aspect, an embodiment of the present invention provides a system for sending data in hybrid networking, where the system includes the foregoing network side device and a terminal.

In the embodiments of the present invention, an order quantity N of highest-order multiple-input multiple-output (MIMO) data in hybrid networking and a quantity M of data types in the hybrid networking are determined, where N is an even number not less than 2, and M is a natural number not less than 2; $i^{th}$ linear transformation processing is performed on $i^{th}$-type data among the M types of data, to obtain N pieces of $i^{th}$-type output data having a same power, where i is a natural number less than or equal to M; and the N pieces of $i^{th}$-type output data having a same power are respectively output to N physical antennas, so that each physical antenna combines output data received by the physical antenna and then sends data obtained after the combining. In this way, by using the embodiments of the present invention, power balancing among physical antennas in hybrid networking is implemented, and performance of data sending in hybrid networking is improved.

DETAILED DESCRIPTION OF ILLUSTRATED EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

When a method for sending data in hybrid networking provided in the embodiments of the present invention is practically applied, as a new data sending method, the method may be applied to hybrid networking scenarios such as a hybrid networking scenario including conventional single-output and 2-order MIMO, a hybrid networking scenario including single-output, 2-order MIMO, and 4-order MIMO, a hybrid networking scenario including single-output and 4-order MIMO, and a hybrid networking scenario including 2-order MIMO and 4-order MIMO, or may be applied to a hybrid networking scenario including higher-order MIMO. In application scenarios provided in the embodiments of the present invention, a network side device, for example, a base station, separately processes non-MIMO data and MIMO data, and performs linear transformation processing on non-MIMO input data and MIMO input data that are obtained after the processing, to obtain multiple pieces of power-balanced non-MIMO output data and multiple pieces of power-balanced MIMO output data, and then separately outputs the power-balanced non-MIMO output data and the power-balanced MIMO output data to physical antennas; the non-MIMO output data and the MIMO output data are combined in the physical antennas, and data obtained after the combining is sent. In this way, by using the embodiments of the present invention, power balancing among physical antennas in hybrid networking is implemented, and performance of data sending in hybrid networking is improved.

Figure 1:
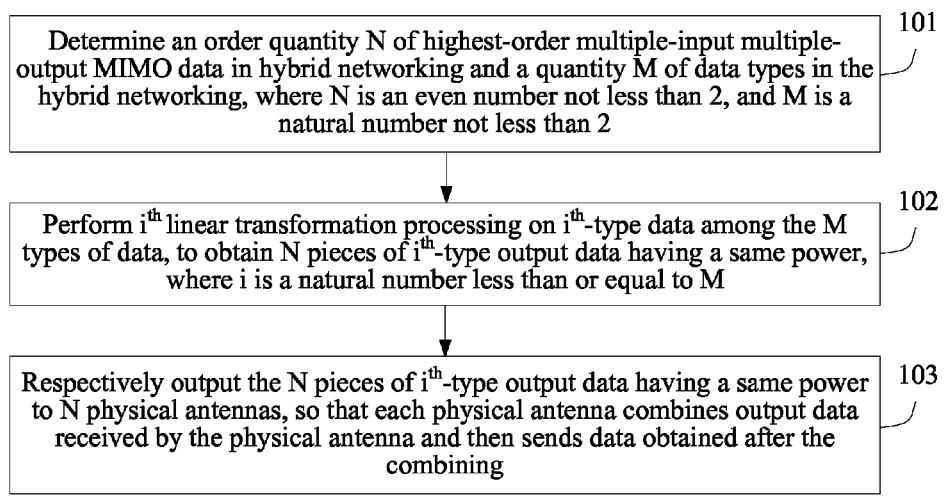
FIG. 1 is a flowchart of a method for sending data in hybrid networking according to an embodiment of the present invention.

FIG. 1 is a flowchart of a method for sending data in hybrid networking according to an embodiment of the present invention. This embodiment of the present invention is executed by a network side device, for example, a base station, and the method used by the network side device to send data to a terminal is described in detail. As shown in FIG. 1, this embodiment includes the following steps:

Step 101: Determine an order quantity N of highest-order multiple-input multiple-output MIMO data in hybrid networking and a quantity M of data types in the hybrid networking, where N is an even number not less than 2, and M is a natural number not less than 2.

The method provided in this embodiment of the present invention may be applied to various hybrid networking structures such as a hybrid networking scenario including conventional single-output and 2-order MIMO, a hybrid networking scenario including single-output, 2-order MIMO, and 4-order MIMO, a hybrid networking scenario including single-output and 4-order MIMO, and a hybrid networking scenario including 2-order MIMO and 4-order MIMO. Therefore, an order quantity N of highest-order MIMO data in hybrid networking and a quantity of structures of sent data, that is, a quantity M of data types, in the hybrid networking may be determined first. For example, if a hybrid networking structure includes conventional single-output and 2-order MIMO, an order quantity N of highest-order MIMO data is 2, and a quantity M of data types is also 2.

Step 102: Perform $i^{th}$ linear transformation processing on $i^{th}$-type data among the M types of data, to obtain N pieces of $i^{th}$-type output data having a same power, where i is a natural number less than or equal to M.

The order quantity of the highest-order MIMO data is the same as a quantity of physical antennas. In order that powers of data transmitted on all physical antennas are balanced, linear transformation processing, for example, virtual antenna mapping (VAM) transformation processing, may be performed on each type of data, so as to obtain multiple pieces of power-balanced output data.

Specifically, if the hybrid networking includes a conventional single-output data type, before linear transformation is performed on conventional single-output non-MIMO user data, the non-MIMO user data and first-type pilot information may be combined first, to obtain non-MIMO data, where the first-type pilot information is a primary common pilot channel P-CPICH, and the first-type pilot information is used by the terminal to perform channel estimation and demodulate the non-MIMO data.

For non-MIMO data, the performing $i^{th}$ linear transformation processing on $i^{th}$-type data includes: performing corresponding linear transformation processing on the non-MIMO data, to obtain N pieces of non-MIMO output data having a same power.

For MIMO user data in the hybrid networking, before linear transformation is performed, precoding processing may be performed on the MIMO user data, to obtain encoded MIMO user data; then the encoded MIMO user data, second-type pilot information, and third-type pilot information are combined, to obtain MIMO data, where the second-type pilot information is channel estimation pilot information of a corresponding channel, and the terminal performs channel estimation according to the second-type pilot information. The second-type pilot information includes Q pieces of second-type pilot data, where Q is the same as an order quantity of the $i^{th}$-type data. Optionally, the second-type pilot information is sent to the terminal at a power determined according to a second power threshold. The third-type pilot information is data demodulation pilot information of a corresponding channel, and the terminal demodulates the MIMO user data according to the third-type pilot information. The third-type pilot information includes Q pieces of third-type pilot data, where Q is the same as the order quantity of the $i^{th}$-type data. Optionally, when the MIMO user data is to be sent, the third-type pilot information is sent to the terminal.

Specifically, in a case in which the $i^{th}$-type data is MIMO data, a quantity of pieces of configured second-type pilot information is the same as an order quantity of the MIMO data, and a quantity of pieces of configured third-type pilot information is also the same as the order quantity of the MIMO data. That is, corresponding second-type pilot information and third-type pilot information are configured for each channel of MIMO data obtained after the precoding processing.

For MIMO data, the performing $i^{th}$ linear transformation processing on $i^{th}$-type data includes performing corresponding linear transformation processing on the MIMO data, to obtain N pieces of MIMO output data having a same power.

Step 103: Respectively output the N pieces of $i^{th}$-type output data having a same power to N physical antennas, so that each physical antenna combines output data received by the physical antenna and then sends data obtained after the combining.

After linear transformation is performed on all types of data, M groups of N pieces of output data having a same power can be obtained, and the N pieces of output data of each type are respectively output to N physical antennas.

Optionally, before power amplification is performed on M pieces of output data in each physical antenna by using an amplifier PA, the data may be combined first by using an adder, power amplification processing is performed on data obtained after the combining, and data obtained after the power amplification processing is sent.

In this embodiment of the present invention, a network side device determines an order quantity N of highest-order multiple-input multiple-output MIMO data in hybrid networking and a quantity M of data types in the hybrid networking, where N is an even number not less than 2, and M is a natural number not less than 2; performs $i^{th}$ linear transformation processing on $i^{th}$-type data among the M types of data, to obtain N pieces of $i^{th}$-type output data having a same power, where i is a natural number less than or equal to M; and respectively outputs the N pieces of $i^{th}$-type output data having a same power to N physical antennas, so that each physical antenna combines output data received by the physical antenna and then sends data obtained after the combining. In this way, by using this embodiment of the present invention, power balancing among physical antennas is implemented, and performance of data sending in hybrid networking is improved.

The foregoing embodiment simply describes the method, which is applicable to various hybrid networking structures, for sending data in hybrid networking. The following introduces the method for sending data in hybrid networking by separately using a hybrid networking structure including conventional single-output and 2-order MIMO and a hybrid networking structure including conventional single-output, 2-order MIMO, and 4-order MIMO as an example.

Figure 2:
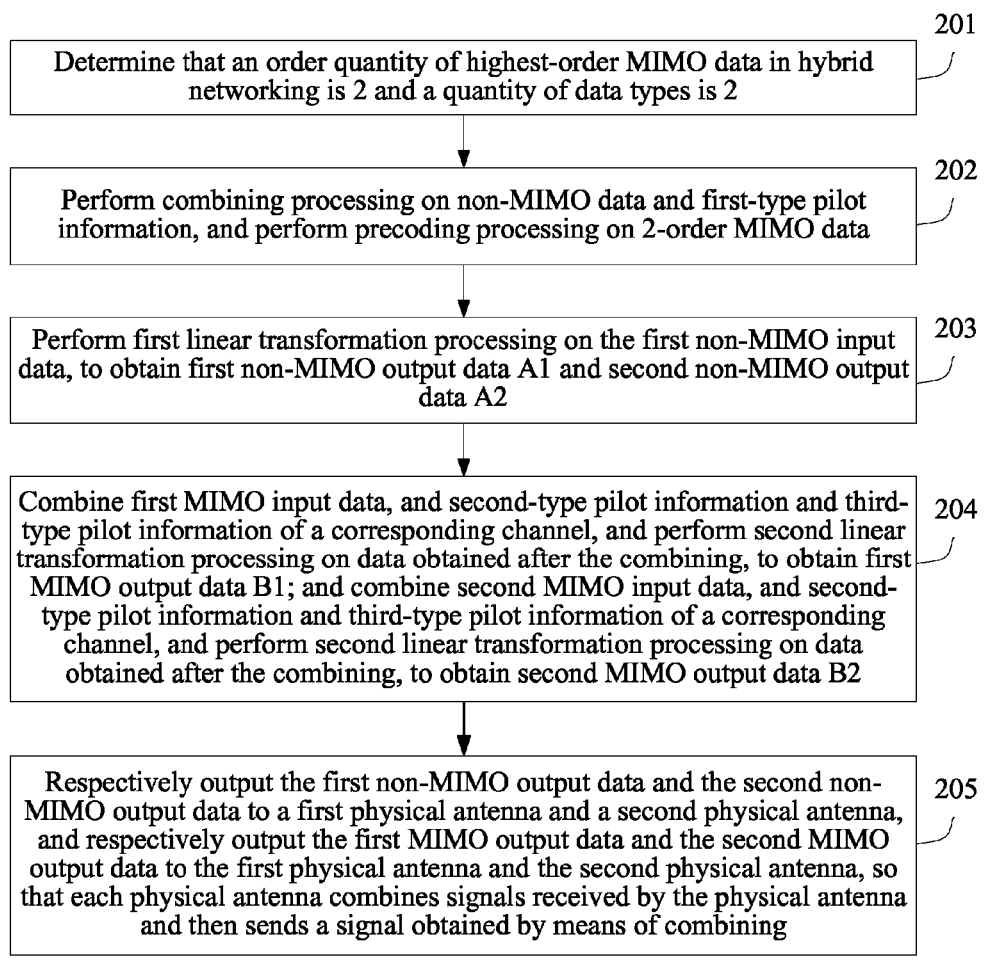
FIG. 2 is a flowchart of a method for sending data in 2-order MIMO hybrid networking according to an embodiment of the present invention.

FIG. 2 is a flowchart of a method for sending data in 2-order MIMO hybrid networking according to an embodiment of the present invention. This embodiment of the present invention is introduced by using hybrid networking including conventional single-output and 2-order MIMO as a scenario. As shown in FIG. 2, this embodiment includes the following steps:

Step 201: Determine that an order quantity of highest-order MIMO data in hybrid networking is 2 and a quantity of data types is 2.

In the hybrid networking structure, data types are non-MIMO data and 2-order MIMO data.

Step 202: Perform combining processing on non-MIMO data and first-type pilot information, and perform precoding processing on 2-order MIMO data.

Figure 3:
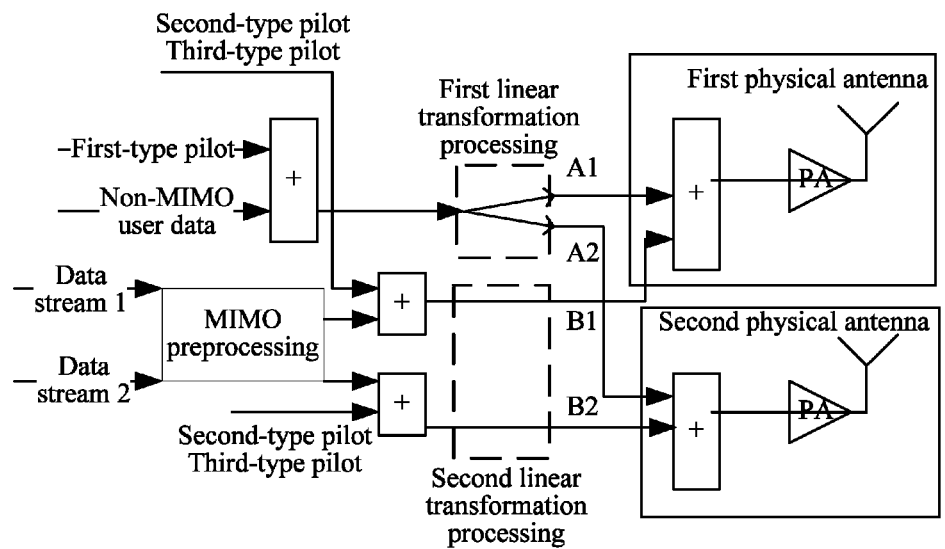
FIG. 3 is a schematic diagram of data sending in 2-order MIMO hybrid networking according to an embodiment of the present invention.

FIG. 3 is a schematic diagram of data sending in 2-order MIMO hybrid networking according to an embodiment of the present invention. The performing combining processing on non-MIMO data is specifically: performing combining processing on the non-MIMO data and the first-type pilot information, to obtain first non-MIMO input data. Optionally, the first-type pilot information may be a primary common pilot channel P-CPICH. A terminal may perform channel estimation and demodulate non-MIMO data according to the P-CPICH. Optionally, the P-CPICH may be transmitted at a high power.

Optionally, the performing precoding processing on 2-order MIMO data includes: performing precoding processing on the MIMO user data, to obtain first MIMO input data and second MIMO input data. Optionally, when precoding processing is performed on the 2-order MIMO data, precoding processing may also be performed on third-type pilot information at the same time. A quantity of pieces of third-type pilot information on which precoding processing is performed is the same as a quantity of MIMO data streams of the order. For example, if precoding is performed on double streams of 2-order MIMO user data, precoding processing is performed on 2 pieces of third-type pilot information; if precoding is performed on a single stream of 2-order MIMO user data, precoding processing is performed on 1 piece of third-type pilot information. Optionally, the third-type pilot information may be D-Pilot pilot information. MIMO channels include a MIMO data channel, a C-Pilot channel used for channel quality estimation (CQI), and a D-Pilot channel used for data demodulation. D-Pilot pilot information is carried on a D-Pilot channel.

Optionally, a transmit power of D-Pilot pilot information used for data demodulation is high, and the D-Pilot pilot information may be sent when there is MIMO data to be sent.

Optionally, a network side device configures D-Pilot pilot information, which is used for data demodulation, for MIMO data of each order. The network side device may also indicate a correspondence between D-Pilot pilot information and MIMO orders to the terminal by using an RRC signaling message or an HS-SCCH command, so that the terminal performs data demodulation according to D-Pilot pilot information.

Step 203: Perform first linear transformation processing on the first non-MIMO input data, to obtain first non-MIMO output data A1 and second non-MIMO output data A2.

Optionally, the first linear transformation processing may be VAM processing, and two pieces of non-MIMO output data having a same power, that is, first non-MIMO output data and second non-MIMO output data, may be obtained after the linear transformation.

Step 204: Combine the first MIMO input data and second-type pilot information and third-type pilot information of a corresponding channel, and perform second linear transformation processing on data obtained after the combining, to obtain first MIMO output data B1; and combine the second MIMO input data and second-type pilot information and third-type pilot information of a corresponding channel, and perform second linear transformation processing on data obtained after the combining, to obtain second MIMO output data B2.

Optionally, the second-type pilot information may be C-Pilot pilot information used for channel quality estimation. After receiving the C-Pilot pilot information, the terminal may perform channel estimation according to the C-Pilot pilot information, and feeds back channel state information to the network side device. The network side device performs precoding processing on the MIMO data according to the channel state information that is fed back. Optionally, the C-Pilot pilot information used for channel quality estimation may be transmitted at a low power.

Optionally, the network side device configures a set of C-Pilot pilot information, which is used for channel estimation, for MIMO data of each order, and further indicates a correspondence between channel estimation C-Pilot pilot information and MIMO orders to the terminal by using an RRC signaling message or an HS-SCCH command, so that the terminal performs channel estimation according to C-Pilot pilot information and feeds back channel state information to the network side device.

Optionally, the network side device indicates code channel numbers corresponding to the first, second, and third pilot information to the terminal.

Optionally, the second linear transformation processing may be transparent transmission processing, that is, powers of the first MIMO input data and the first MIMO output data are the same, and powers of the second MIMO input data and the second MIMO output data are the same. The following describes a method for implementing power balancing among physical antennas in the technical solution of the present invention by using FIG. 3 as an example.

It is assumed that data stream 1 and data stream 2 that are input to a 2-order MIMO preprocessing module are $s_1$ and $s_2$ respectively, where if $s_1$ or $s_2$ is equal to 0, single-stream MIMO is formed; otherwise, double-stream MIMO is formed. A preprocessing operation is as follows, where B1 and B2 are output data obtained after the second linear transformation processing in FIG. 3, where $$\begin{bmatrix} B1 \\ B2 \end{bmatrix} = W \begin{bmatrix} s_1 \\ s_2 \end{bmatrix} = \frac{\sqrt{2}}{2} \begin{bmatrix} w_1 & w_2 \\ w_3 & w_4 \end{bmatrix} \begin{bmatrix} s_1 \\ s_2 \end{bmatrix} = \frac{\sqrt{2}}{2} \begin{bmatrix} w_1 s_1 + w_2 s_2 \\ w_3 s_1 + w_4 s_2 \end{bmatrix}$$

$$P(B1) = E \left| \frac{\sqrt{2}}{2}(w_1 s_1 + w_2 s_2) \right|^2$$

$$P(B2) = E \left| \frac{\sqrt{2}}{2}(w_3 s_1 + w_4 s_2) \right|^2.$$

In the foregoing formula, W is precoding, and $|w_i|=1$. $P(B1)$ is a power of B|, and $P(B2)$ is a power of B2. In a double-stream case, $P(B1)=P(B2)$. In a single-stream case, $s_1$ or $s_2$ is 0, and using $s_2=0$ as an example, then $$P(B1) = E \left| \frac{\sqrt{2}}{2}(w_1 s_1) \right|^2$$

$$P(B2) = E \left| \frac{\sqrt{2}}{2}(w_3 s_1) \right|^2.$$

Apparently, for any $w_i$, $P(B1)=P(B2)$. Therefore, the technical solution provided in this embodiment of the present invention implements power balancing among physical antennas without restricting a codebook in a case in which the second linear transformation processing is transparent transmission.

Optionally, the second linear transformation processing may be unitary matrix processing. Specifically, if a linear transformation matrix U used for linear transformation processing satisfies $UU^T=I$, where I is an identity matrix, and U is a unitary matrix, and then the second linear transformation processing is unitary matrix processing. If the second linear transformation processing is unitary matrix processing, when MIMO input is single-stream MIMO, in order to implement power balancing among physical antennas, use of some codebooks needs to be restricted.

Step 205: Respectively output the first non-MIMO output data and the second non-MIMO output data to a first physical antenna and a second physical antenna, and respectively output the first MIMO output data and the second MIMO output data to the first physical antenna and the second physical antenna, so that each physical antenna combines signals received by the physical antenna and then sends a signal obtained after the combining.

Specifically, each physical antenna performs combining processing on non-MIMO output data and MIMO output data that are received by the physical antenna, then performs power amplification processing, and then sends data obtained after the power amplification processing.

In this embodiment of the present invention, for each piece of to-be-sent data in hybrid networking, powers of all pieces of output data obtained after the linear transformation processing are the same. Therefore, a signal obtained by adding an output signal obtained by means of one type of linear transformation processing and an output signal obtained by means of another type of linear transformation processing is the same as a signal obtained by adding another output signal obtained by means of the one type of linear transformation processing and another output signal obtained by means of the another type of linear transformation processing, thereby achieving an effect of power balancing among physical antennas. Further, when linear transformation processing is transparent transmission processing, an effect of power balancing among physical antennas is achieved without restricting a codebook.

The foregoing describes a method for sending data in hybrid networking including conventional single-output and 2-order MIMO. The following describes a method for sending data in hybrid networking including conventional single-output and high-order MIMO by using an embodiment.

Figure 4:
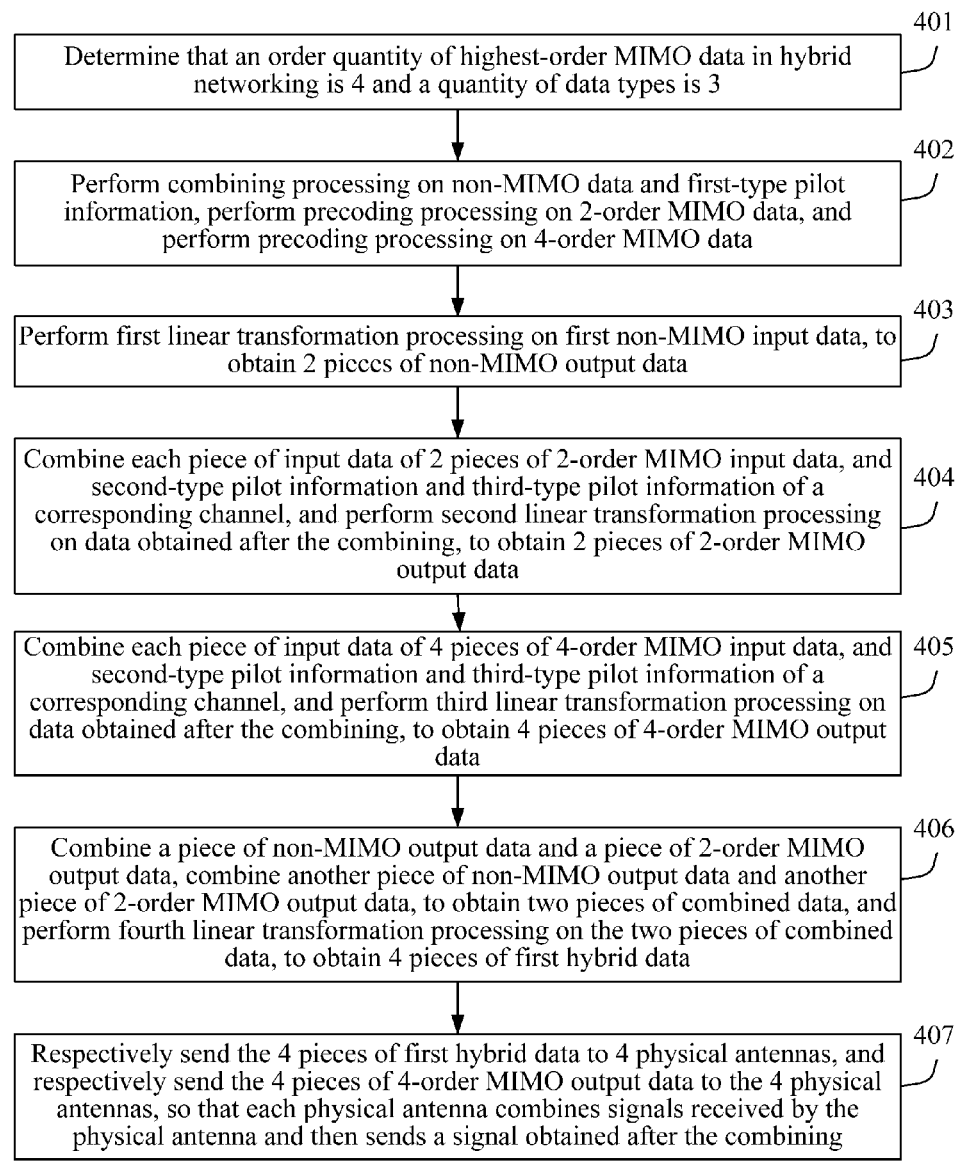
FIG. 4 is a flowchart of a method for sending data in 4-order MIMO hybrid networking according to an embodiment of the present invention.

FIG. 4 is a flowchart of a method for sending data in 4-order MIMO hybrid networking according to an embodiment of the present invention. This embodiment of the present invention is introduced by using hybrid networking including conventional single-output, low-order MIMO, and high-order MIMO as a scenario. As shown in FIG. 4, this embodiment includes the following steps:

Step 401: Determine that an order quantity of highest-order MIMO data in hybrid networking is 4 and a quantity of data types is 3.

In the hybrid networking structure, data types are non-MIMO data, 2-order MIMO data, and 4-order MIMO data.

Figure 5:
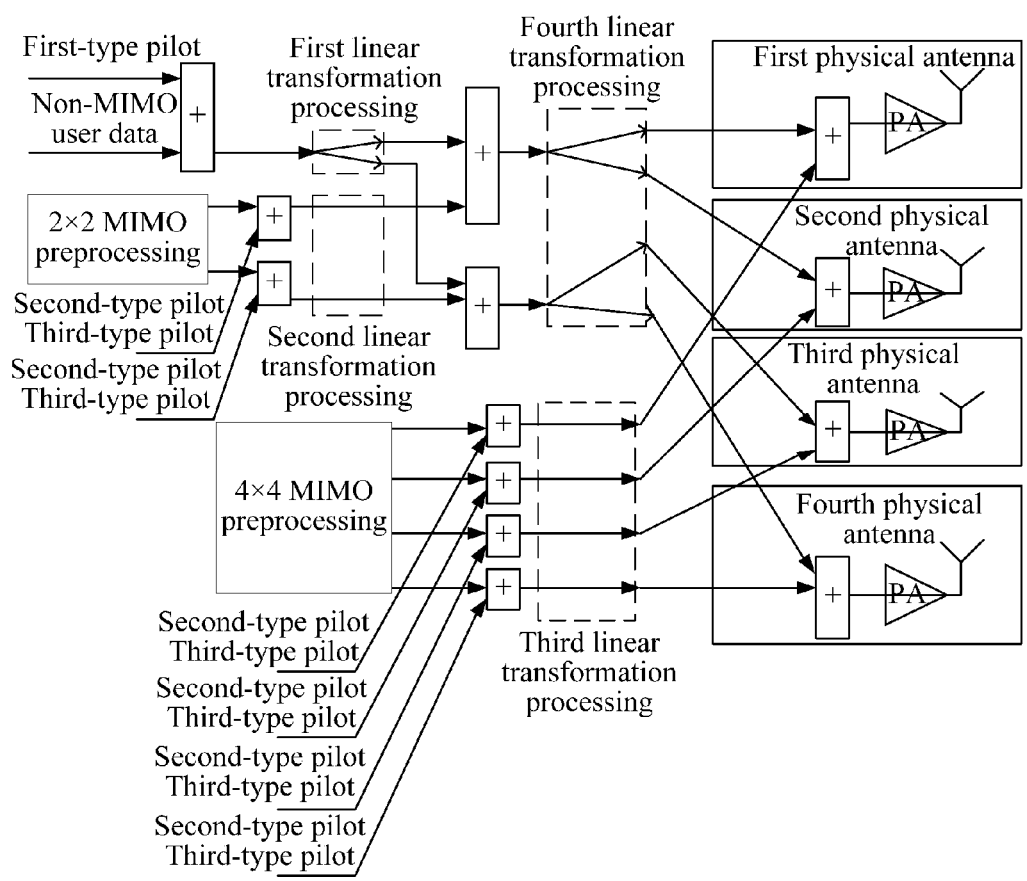
FIG. 5 is a schematic diagram of data sending in 4-order MIMO hybrid networking according to an embodiment of the present invention.

The hybrid networking includes 3 types of data. According to the data sending process in FIG. 1, linear transformation processing may be performed on each type of data once, to obtain 4 pieces of output data corresponding to each type of data. Optionally, for a scenario in which hybrid networking includes 3 or more types of data, linear transformation processing may be performed on non-highest-order MIMO data for multiple times, so as to output power-balanced data, as shown in FIG. 5, which is a schematic diagram of data sending in 4-order MIMO hybrid networking according to an embodiment of the present invention. This embodiment of the present invention is described with reference to the data sending method shown in FIG. 5.

Step 402: Perform combining processing on non-MIMO data and first-type pilot information, perform precoding processing on 2-order MIMO data, and perform precoding processing on 4-order MIMO data.

The performing processing on non-MIMO data and first-type pilot information includes: performing combining processing on the non-MIMO data and the first-type pilot information, to obtain first non-MIMO input data. Optionally, the first-type pilot information may be a primary common pilot channel (P-CPICH). A terminal performs channel estimation and demodulates non-MIMO data according to the P-CPICH. Optionally, the P-CPICH may be transmitted at a high power.

Optionally, the performing precoding processing on 2-order MIMO data includes: performing precoding processing on the 2-order MIMO user data, to obtain first MIMO input data and second MIMO input data. Optionally, when precoding processing is performed on the 2-order MIMO data, precoding processing may also be performed on third-type pilot information at the same time. A quantity of pieces of third-type pilot information on which precoding processing is performed is the same as a quantity of MIMO data streams of the order. For example, if precoding is performed on double streams of 2-order MIMO user data, precoding processing is performed on 2 pieces of third-type pilot information; if precoding is performed on a single stream of 2-order MIMO user data, precoding processing is performed on 1 piece of third-type pilot information. Optionally, the third-type pilot information may be D-Pilot pilot information. MIMO user channels include a MIMO data channel, a C-Pilot channel used for channel quality estimation (Channel Quality Indicator, CQI), and a D-Pilot channel used for data demodulation. D-Pilot pilot information is carried on a D-Pilot channel.

Optionally, the performing precoding processing on 4-order MIMO data includes: performing precoding processing on 4-order MIMO user data, to obtain 4 pieces of 4-order MIMO input data. Optionally, when precoding processing is performed on the 4-order MIMO data, precoding processing may also be performed on third-type pilot information at the same time. A quantity of pieces of third-type pilot information on which precoding processing is performed is the same as a quantity of MIMO data streams of the order. Optionally, the third-type pilot information may be D-Pilot pilot information. MIMO user channels include a MIMO data channel, a C-Pilot channel used for channel quality estimation (CQI), and a D-Pilot channel used for data demodulation. D-Pilot pilot information is carried on a D-Pilot channel.

Optionally, a transmit power of D-Pilot pilot information used for data demodulation is high, and the D-Pilot pilot information may be sent when there is MIMO data to be sent.

Optionally, a network side device configures D-Pilot pilot information, which is used for data demodulation, for MIMO data of each order. The network side device may also indicate a correspondence between D-Pilot pilot information and MIMO orders to the terminal by using an RRC signaling message or an HS-SCCH command, so that the terminal performs data demodulation according to D-Pilot pilot information.

Step 403: Perform first linear transformation processing on first non-MIMO input data, to obtain 2 pieces of non-MIMO output data.

Step 404: Combine each piece of input data of the 2 pieces of 2-order MIMO input data, and second-type pilot information and third-type pilot information of a corresponding channel, and perform second linear transformation processing on data obtained after the combining, to obtain 2 pieces of 2-order MIMO output data.

A quantity of pieces of second-type pilot information is the same as an order quantity of MIMO of the order.

Step 405: Combine each piece of input data of the 4 pieces of 4-order MIMO input data, and second-type pilot information and third-type pilot information of a corresponding channel, and perform third linear transformation processing on data obtained after the combining, to obtain 4 pieces of 4-order MIMO output data.

Optionally, the second-type pilot information may be C-Pilot pilot information used for channel quality estimation. After receiving the C-Pilot pilot information, the terminal may perform channel estimation according to the C-Pilot pilot information, and feeds back channel state information to the network side device. The network side device performs precoding processing on the MIMO data according to the channel state information that is fed back. Optionally, the C-Pilot pilot information used for channel quality estimation may be transmitted at a low power.

Optionally, the network side device configures a set of C-Pilot pilot information, which is used for channel estimation, for MIMO data of each order, and further indicates a correspondence between channel estimation C-Pilot pilot information and MIMO orders to the terminal by using an RRC signaling message or an HS-SCCH command, so that the terminal performs channel estimation according to C-Pilot pilot information and feeds back channel state information to the network side device.

Optionally, the network side device indicates code channel numbers corresponding to the first, second, and third pilot information to the terminal.

Optionally, the second linear transformation processing and the third linear transformation processing may be transparent transmission processing, that is, powers of 2-order MIMO input data and corresponding 2-order MIMO output data are the same, and powers of 4-order MIMO input data and corresponding 4-order output data are the same. When the second linear transformation processing is transparent transmission processing, a MIMO user does not have problems such as a restricted codebook and imbalance among equivalent channels. Optionally, the second linear transformation processing and the third linear transformation processing may also be unitary matrix processing.

Step 406: Combine a piece of non-MIMO output data and a piece of 2-order MIMO output data, combine another piece of non-MIMO output data and another piece of 2-order MIMO output data, to obtain two pieces of combined data, and perform fourth linear transformation processing on the two pieces of obtained data, to obtain 4 pieces of first hybrid data.

Powers of the 4 pieces of first hybrid data obtained after the fourth linear transformation processing are balanced.

Step 407: Respectively send the 4 pieces of first hybrid data to 4 physical antennas, and respectively send the 4 pieces of 4-order MIMO output data to the 4 physical antennas, so that each physical antenna combines signals received by the physical antenna and then sends a signal obtained after the combining.

Specifically, each physical antenna performs combining processing on first hybrid data and 4-order MIMO output data that are received by the physical antenna, then performs power amplification processing, and then sends data obtained after the power amplification processing.

In this embodiment of the present invention, for each piece of to-be-sent data in hybrid networking, powers of all pieces of output data obtained after the linear transformation processing are the same. Therefore, a signal obtained by adding an output signal obtained by means of a type of linear transformation processing and an output signal obtained by means of another type of linear transformation processing is the same as a signal obtained by adding another output signal obtained by means of the one type of linear transformation processing and another output signal obtained by means of the another type of linear transformation processing, thereby achieving an effect of power balancing among physical antennas. Further, when linear transformation processing is transparent transmission processing, an effect of power balancing among physical antennas can be further achieved without restricting a codebook.

The methods for sending data in 2-order hybrid networking and 4-order hybrid networking are respectively described in the foregoing two embodiments. For other higher-order hybrid networking, the same sending method may also be used to perform data sending.

Figure 6:
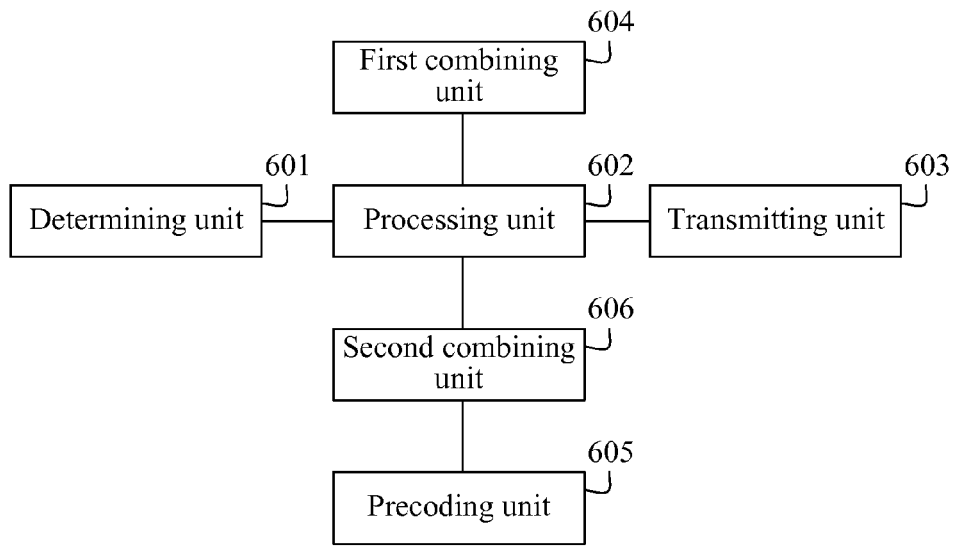
FIG. 6 is a schematic diagram of an apparatus for sending data in hybrid networking according to an embodiment of the present invention.

Correspondingly, an embodiment of the present invention further provides an apparatus for sending data in hybrid networking. FIG. 6 is a schematic diagram of an apparatus for sending data in hybrid networking according to an embodiment of the present invention. The apparatus for sending data is configured to implement the methods in the foregoing embodiments. As shown in FIG. 6, the apparatus includes the following units:

A determining unit 601 is configured to determine an order quantity N of highest-order multiple-input multiple-output MIMO data in hybrid networking and a quantity M of data types in the hybrid networking, where N is an even number not less than 2, and M is a natural number not less than 2, and transmit N and M to a processing unit.

The apparatus provided in the embodiments of the present invention may be applied to various hybrid networking structures such as a hybrid networking scenario including conventional single-output and 2-order MIMO, a hybrid networking scenario including single-output, 2-order MIMO, and 4-order MIMO, a hybrid networking scenario including single-output and 4-order MIMO, and a hybrid networking scenario including 2-order MIMO and 4-order MIMO. Therefore, an order quantity N of highest-order MIMO data in hybrid networking and a quantity of structures of sent data, that is, a quantity M of data types, in the hybrid networking may be determined first.

The processing unit 602 is configured to perform $i^{th}$ linear transformation processing on $i^{th}$-type data among the M types of data, to obtain N pieces of $i^{th}$-type output data having a same power, where i is a natural number less than or equal to M, and transmit the N pieces of $i^{th}$-type output data having a same power to a transmitting unit.

The order quantity of the highest-order MIMO data is the same as a quantity of physical antennas. In order that powers of data transmitted on all physical antennas are balanced, linear transformation processing, for example, virtual antenna mapping VAM transformation processing, may be performed on each type of data, so as to obtain multiple pieces of power-balanced output data.

The transmitting unit 603 is configured to respectively output the N pieces of $i^{th}$-type output data having a same power to N physical antennas, so that each physical antenna combines output data received by the physical antenna and then sends data obtained after the combining.

Optionally, the apparatus provided in this embodiment of the present invention further includes: a first combining unit 604, configured to: when the $i^{th}$-type data includes non-MIMO user data, combine the non-MIMO user data and first-type pilot information, to obtain non-MIMO data, where the first-type pilot information is a primary common pilot channel P-CPICH, and the first-type pilot information is used by the terminal to perform channel estimation and demodulate the non-MIMO data. Optionally, the P-CPICH may be transmitted at a high power.

In this case, the processing unit 602 is specifically configured to perform corresponding linear transformation processing on the non-MIMO data obtained after the combining, to obtain N pieces of non-MIMO output data having a same power.

Specifically, if the hybrid networking includes a conventional single-output data type, before linear transformation is performed on conventional single-output non-MIMO user data, the non-MIMO user data and first-type pilot information may be combined first, to obtain non-MIMO data, where the first-type pilot information is a primary common pilot channel P-CPICH, and the first-type pilot information is used by the terminal to perform channel estimation and demodulate the non-MIMO data obtained after the combining.

Optionally, the apparatus provided in this embodiment of the present invention further includes: a precoding unit 605, configured to: when the $i^{th}$-type data includes MIMO user data, perform precoding processing on the MIMO user data, to obtain encoded MIMO user data, or perform precoding processing on the MIMO user data and third-type pilot information, to obtain the encoded MIMO user data; and a second combining unit 606, configured to combine the encoded MIMO user data, second-type pilot information, and the third-type pilot information, to obtain MIMO data, where the second-type pilot information is channel estimation pilot information used by the terminal to perform channel estimation, and the third-type pilot information is data demodulation pilot information used by the terminal to demodulate the MIMO user data.

Optionally, the second-type pilot information may be C-Pilot pilot information used for channel quality estimation. After receiving the C-Pilot pilot information, the terminal may perform channel estimation according to the C-Pilot pilot information, and feeds back channel state information to a network side device. The network side device performs precoding processing on the MIMO data according to the channel state information that is fed back. Optionally, the C-Pilot pilot information used for channel quality estimation may be transmitted at a low power.

Optionally, the network side device configures a set of C-Pilot pilot information, which is used for channel estimation, for MIMO data of each order, and further indicates a correspondence between channel estimation C-Pilot pilot information and MIMO orders to the terminal by using an RRC signaling message or an HS-SCCH command, so that the terminal performs channel estimation according to C-Pilot pilot information and feeds back channel state information to the network side device.

Optionally, the network side device indicates code channel numbers corresponding to the first, second, and third pilot information to the terminal.

A transmit power of D-Pilot pilot information used for data demodulation is high, and the D-Pilot pilot information may be sent when there is MIMO data to be sent. Optionally, the network side device configures D-Pilot pilot information, which is used for data demodulation, for MIMO data of each order. The network side device may also indicate a correspondence between D-Pilot pilot information and MIMO orders to the terminal by using an RRC signaling message or an HS-SCCH command, so that the terminal performs data demodulation according to D-Pilot pilot information.

Specifically, in a case in which the $i^{th}$-type data is MIMO data, a quantity of pieces of configured second-type pilot information is the same as an order quantity of the MIMO data, and a quantity of pieces of configured third-type pilot information is also the same as the order quantity of the MIMO data. That is, corresponding second-type pilot information and third-type pilot information are configured for each channel of MIMO data obtained after the precoding processing.

The processing unit 602 is specifically configured to perform corresponding linear transformation processing on the MIMO data, to obtain N pieces of MIMO output data having a same power.

For MIMO user data in the hybrid networking, before linear transformation is performed, precoding processing may be performed on the MIMO user data, to obtain encoded MIMO user data; then the encoded MIMO user data, second-type pilot information, and third-type pilot information are combined, to obtain MIMO data, where the second-type pilot information is channel estimation pilot information of a corresponding channel and is sent to the terminal at a power determined according to a second power threshold, so that the terminal performs channel estimation according to the second-type pilot information; the third-type pilot information is data demodulation pilot information of a corresponding channel, and the third-type pilot information is sent to the terminal when the MIMO user data is to be sent, so that the terminal demodulates the MIMO user data according to the third-type pilot information.

When M is 2, the processing unit 602 is configured to: perform first linear transformation processing on first-type data, to obtain N pieces of first-type output data having a same power; and perform second linear transformation processing on second-type data, to obtain N pieces of second-type output data having a same power.

When M is 3, the processing unit 602 is configured to: perform first linear transformation processing on first-type data, to obtain N pieces of first-type output data having a same power; perform second linear transformation processing on second-type data, to obtain N pieces of second-type output data having a same power; and perform third linear transformation processing on third-type data, to obtain N pieces of third-type output data having a same power.

When M is 3, the processing unit 602 is configured to: perform first linear transformation processing on first-type data, to obtain P pieces of first-type output data having a same power, where P is an order quantity of second-type data; perform second linear transformation processing on the second-type data, to obtain P pieces of second-type output data having a same power; combine the P pieces of first-type output data having a same power and the P pieces of second-type output data having a same power, and perform fourth linear transformation processing, to obtain N pieces of first hybrid output data having a same power; and perform third linear transformation processing on third-type data, to obtain N pieces of third-type output data having a same power.

The transmitting unit 603 is configured to: output the N pieces of first hybrid output data having a same power to the N physical antennas, and output the N pieces of third-type output data having a same power to the N physical antennas.

In this embodiment of the present invention, the apparatus for sending data in hybrid networking determines an order quantity N of highest-order multiple-input multiple-output MIMO data in hybrid networking and a quantity M of data types in the hybrid networking, where N is an even number not less than 2, and M is a natural number not less than 2; performs $i^{th}$ linear transformation processing on $i^{th}$-type data among the M types of data, to obtain N pieces of $i^{th}$-type output data having a same power, where i is a natural number less than or equal to M; and respectively outputs the N pieces of $i^{th}$-type output data having a same power to N physical antennas, so that each physical antenna combines output data received by the physical antenna and then sends data obtained after the combining. In this way, by using this embodiment of the present invention, power balancing among physical antennas in hybrid networking is implemented, and performance of data sending in hybrid networking is improved.

Figure 7:
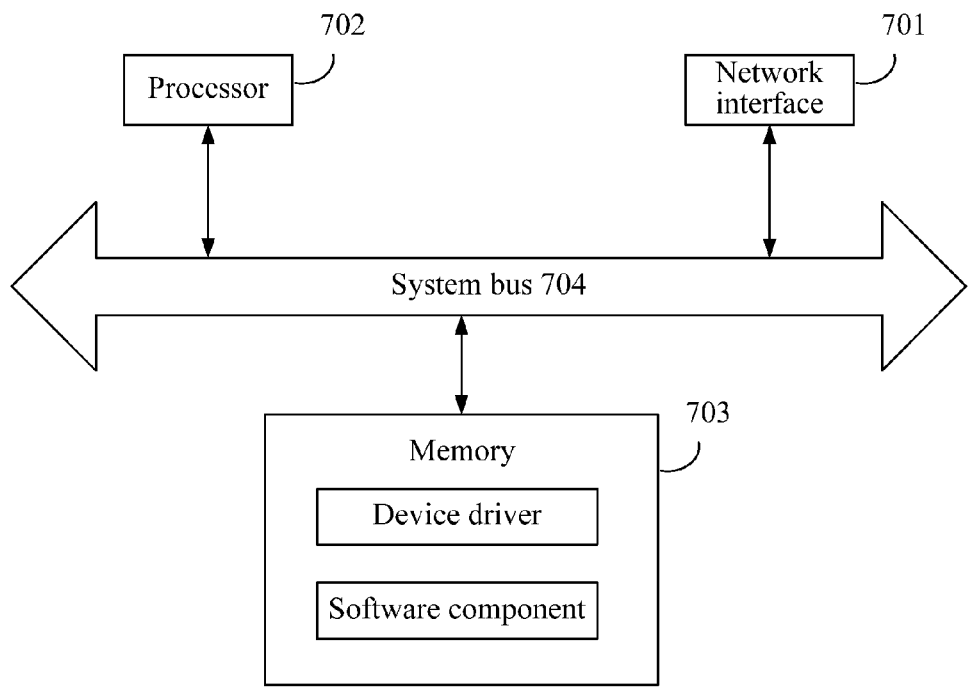
FIG. 7 is a schematic structural diagram of a network side device according to an embodiment of the present invention.

Correspondingly, an embodiment of the present invention further provides a network side device. FIG. 7 is a schematic structural diagram of a network side device according to an embodiment of the present invention. The network side device is configured to implement the methods in the foregoing embodiments. As shown in FIG. 7, this embodiment includes a network interface 701, a processor 702, and a memory 703.

In this embodiment of the present invention, the network interface may include a physical antenna, and the network interface is configured to communicate with another network entity.

A software module and a device driver are in the memory 703. The software module can execute various functional modules in the foregoing method of the present invention; and the device driver may be a network driver or an interface driver.

When started, these software components are loaded into the memory 703 and then accessed by the processor 702, and execute the following instructions: determining an order quantity N of highest-order multiple-input multiple-output MIMO data in hybrid networking and a quantity M of data types in the hybrid networking, where N is an even number not less than 2, and M is a natural number not less than 2; performing $i^{th}$ linear transformation processing on $i^{th}$-type data among the M types of data, to obtain N pieces of $i^{th}$-type output data having a same power, where i is a natural number less than or equal to M; and respectively outputting the N pieces of $i^{th}$-type output data having a same power to N physical antennas, so that each physical antenna combines output data received by the physical antenna and then sends data obtained after the combining.

Further, when the $i^{th}$-type data includes non-MIMO user data, the application can further make the processor and the network side device execute the following instruction: combining the non-MIMO user data and first-type pilot information, to obtain non-MIMO data, where the first-type pilot information is a primary common pilot channel P-CPICH, and the first-type pilot information is used by the terminal to perform channel estimation and demodulate the non-MIMO data; and the process executed by the processor of performing $i^{th}$ linear transformation processing on $i^{th}$-type data includes an instruction of: performing corresponding linear transformation processing on the non-MIMO data obtained after the combining, to obtain N pieces of non-MIMO output data having a same power.

Specifically, if the hybrid networking includes a conventional single-output data type, before linear transformation is performed on conventional single-output non-MIMO user data, the non-MIMO user data and first-type pilot information may be combined first, to obtain non-MIMO data.

Further, when the $i^{th}$-type data includes MIMO user data, the application can further make the processor and the network side device execute the following instructions: performing precoding processing on the MIMO user data, to obtain encoded MIMO user data, or performing precoding processing on the MIMO user data and third-type pilot information, to obtain the encoded MIMO user data; and combining the encoded MIMO user data, second-type pilot information, and the third-type pilot information, to obtain MIMO data, where the second-type pilot information is channel estimation pilot information used by the terminal to perform channel estimation, and the third-type pilot information is data demodulation pilot information used by the terminal to demodulate the MIMO user data.

Optionally, the second-type pilot information may be C-Pilot pilot information used for channel quality estimation. After receiving the C-Pilot pilot information, the terminal may perform channel estimation according to the C-Pilot pilot information, and feeds back channel state information to the network side device. The network side device performs precoding processing on the MIMO data according to the channel state information that is fed back. Optionally, the C-Pilot pilot information used for channel quality estimation may be transmitted at a low power.

Optionally, the network side device configures a set of C-Pilot pilot information, which is used for channel estimation, for MIMO data of each order, and further indicates a correspondence between channel estimation C-Pilot pilot information and MIMO orders to the terminal by using an RRC signaling message or an HS-SCCH command, so that the terminal performs channel estimation according to C-Pilot pilot information and feeds back channel state information to the network side device.

Optionally, the network side device indicates code channel numbers corresponding to the first, second, and third pilot information to the terminal.

A transmit power of D-Pilot pilot information used for data demodulation is high, and the D-Pilot pilot information may be sent when there is MIMO data to be sent. Optionally, the network side device configures D-Pilot pilot information, which is used for data demodulation, for MIMO data of each order. The network side device may also indicate a correspondence between D-Pilot pilot information and MIMO orders to the terminal by using an RRC signaling message or an HS-SCCH command, so that the terminal performs data demodulation according to D-Pilot pilot information.

Specifically, in a case in which the $i^{th}$-type data is MIMO data, a quantity of pieces of configured second-type pilot information is the same as an order quantity of the MIMO data, and a quantity of pieces of configured third-type pilot information is also the same as the order quantity of the MIMO data. That is, corresponding second-type pilot information and third-type pilot information are configured for each channel of MIMO data obtained after the precoding processing.

The process executed by the processor of performing $i^{th}$ linear transformation processing on $i^{th}$-type data includes an instruction of: performing corresponding linear transformation processing on the MIMO data, to obtain N pieces of MIMO output data having a same power.

Further, when M is 2, the process executed by the processor of performing $i^{th}$ linear transformation processing on $i^{th}$-type data to obtain N pieces of $i^{th}$-type output data having a same power includes the following instructions: performing first linear transformation processing on first-type data, to obtain N pieces of first-type output data having a same power; and performing second linear transformation processing on second-type data, to obtain N pieces of second-type output data having a same power.

Further, when M is 3, the process executed by the processor of performing $i^{th}$ linear transformation processing on $i^{th}$-type data to obtain N pieces of $i^{th}$-type output data having a same power includes the following instructions: performing first linear transformation processing on first-type data, to obtain N pieces of first-type output data having a same power; performing second linear transformation processing on second-type data, to obtain N pieces of second-type output data having a same power; and performing third linear transformation processing on third-type data, to obtain N pieces of third-type output data having a same power.

Further, when M is 3, the process executed by the processor of performing $i^{th}$ linear transformation processing on $i^{th}$-type data to obtain N pieces of $i^{th}$-type output data having a same power includes the following instructions: performing first linear transformation processing on first-type data, to obtain P pieces of first-type output data having a same power, where P is an order quantity of second-type data; performing second linear transformation processing on the second-type data, to obtain P pieces of second-type output data having a same power; combining the P pieces of first-type output data having a same power and the P pieces of second-type output data having a same power, and performing fourth linear transformation processing, to obtain N pieces of first hybrid output data having a same power; and performing third linear transformation processing on third-type data, to obtain N pieces of third-type output data having a same power.

Further, the process executed by the processor of respectively outputting M groups of N pieces of $i^{th}$-type output data having a same power to N physical antennas includes the following instructions: outputting the N pieces of first hybrid output data having a same power to the N physical antennas, and outputting the N pieces of third-type output data having a same power to the N physical antennas.

A system bus 704 is configured to connect the network interface 701, the processor 702, and the memory 703. It needs to be noted that the system bus 704 may be an ISA (Industry Standard Architecture) bus, a PCI (Peripheral Component Interconnect) bus, an EISA (Extended Industry Standard Architecture) bus, or the like. The bus may be one or more physical lines, and when the bus is multiple physical lines, the bus may be classified into an address bus, a data bus, a control bus, and the like.

In this way, by using this embodiment of the present invention, power balancing among physical antennas is implemented in hybrid networking without restricting a codebook, so that optimal performance of MIMO is achieved.

An embodiment of the present invention further provides a system for sending data in hybrid networking. The system may apply the method for sending data in hybrid networking provide in the embodiments of the present invention, and includes the foregoing apparatus and a terminal, where the apparatus provided in the foregoing embodiment may be correspondingly used as the apparatus. In the system, the foregoing apparatus determines an order quantity N of highest-order multiple-input multiple-output MIMO data in hybrid networking and a quantity M of data types in the hybrid networking, where N is an even number not less than 2, and M is a natural number not less than 2; performs $i^{th}$ linear transformation processing on $i^{th}$-type data among the M types of data, to obtain N pieces of $i^{th}$-type output data having a same power, where i is a natural number less than or equal to M; and respectively outputs the N pieces of $i^{th}$-type output data having a same power to N physical antennas, so that each physical antenna combines output data received by the physical antenna and then sends data obtained after the combining. In this way, by using this embodiment of the present invention, power balancing among physical antennas in hybrid networking is implemented.

An embodiment of the present invention further provides a system for sending data in hybrid networking. The system may apply the method for sending data in hybrid networking provide in the embodiments of the present invention, and includes the foregoing network side device and a terminal, where the network side device provided in the foregoing embodiment may be correspondingly used as the network side device. In the system, the foregoing network side device determines an order quantity N of highest-order multiple-input multiple-output MIMO data in hybrid networking and a quantity M of data types in the hybrid networking, where N is an even number not less than 2, and M is a natural number not less than 2; performs $i^{th}$ linear transformation processing on $i^{th}$-type data among the M types of data, to obtain N pieces of $i^{th}$-type output data having a same power, where i is a natural number less than or equal to M; and respectively outputs the N pieces of $i^{th}$-type output data having a same power to N physical antennas, so that each physical antenna combines output data received by the physical antenna and then sends data obtained after the combining. In this way, by using this embodiment of the present invention, power balancing among physical antennas in hybrid networking is implemented.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method for sending data in hybrid networking, wherein the method comprises:
    determining an order quantity N of highest-order multiple-input multiple-output (MIMO) data in hybrid networking and a quantity M of data types in the hybrid networking, wherein N is an even number not less than 2, and M is a natural number not less than 2;
    performing precoding processing on MIMO user data to obtain encoded MIMO user data, or performing precoding processing on the MIMO user data and third-type pilot information, to obtain the encoded MIMO user data;
    combining the encoded MIMO user data, second-type pilot information, and the third-type pilot information, to obtain the MIMO data, wherein the second-type pilot information is channel estimation pilot information used by a terminal to perform channel estimation, and the third-type pilot information is data demodulation pilot information used by the terminal to demodulate the MIMO user data;
    performing $i^{th}$ linear transformation processing on $i^{th}$-type data among the M types of data, to obtain N pieces of $i^{th}$-type output data having a same power and N pieces of MIMO output data having a same power, wherein i is a natural number less than or equal to M; and
    respectively outputting the N pieces of the $i^{th}$-type output data having a same power to N physical antennas, so that each physical antenna combines output data received by the physical antenna and then sends data obtained after the combining.

2. The method according to claim 1, wherein a quantity of pieces of the second-type pilot information is the same as an order quantity of the $i^{th}$-type data, and a quantity of pieces of the third-type pilot information is the same as the order quantity of the $i^{th}$-type data.

3. The method according to claim 1, wherein when M is 2, the performing $i^{th}$ linear transformation processing on $i^{th}$-type data comprises:
    performing first linear transformation processing on first-type data, to obtain N pieces of first-type output data having a same power; and
    performing second linear transformation processing on second-type data, to obtain N pieces of second-type output data having a same power.

4. The method according to claim 1, wherein when M is 3, the performing $i^{th}$ linear transformation processing on $i^{th}$-type data comprises:
    performing first linear transformation processing on first-type data, to obtain N pieces of first-type output data having a same power;
    performing second linear transformation processing on second-type data, to obtain N pieces of second-type output data having a same power; and
    performing third linear transformation processing on third-type data, to obtain N pieces of third-type output data having a same power.

5. The method according to claim 1, wherein when M is 3, the performing $i^{th}$ linear transformation processing on $i^{th}$-type data comprises:
    performing first linear transformation processing on first-type data, to obtain P pieces of first-type output data having a same power, wherein P is an order quantity of second-type data;
    performing second linear transformation processing on the second-type data, to obtain P pieces of second-type output data having a same power;
    combining the P pieces of first-type output data having a same power and the P pieces of second-type output data having a same power, and performing fourth linear transformation processing, to obtain N pieces of first hybrid output data having a same power; and
    performing third linear transformation processing on third-type data, to obtain N pieces of third-type output data having a same power.

6. The method according to claim 5, wherein the respectively outputting M types of N pieces of $i^{th}$-type output data having a same power to N physical antennas comprises outputting the N pieces of first hybrid output data having a same power to the N physical antennas, and outputting the N pieces of third-type output data having a same power to the N physical antennas.

7. A network side device, wherein the network side device comprises:
    a processor;
    a network interface;
    a memory; and
    an application physically stored in the memory, wherein the application comprises instructions that uses to make the processor and the network side device execute the following processes:
        determining an order quantity N of highest-order multiple-input multiple-output (MIMO) data in hybrid networking and a quantity M of data types in the hybrid networking, wherein N is an even number not less than 2, and M is a natural number not less than 2;

performing $i^{th}$ linear transformation processing on $i^{th}$-type data among the M types of data, to obtain N pieces of $i^{th}$-type output data having a same power, wherein i is a natural number less than or equal to M; and respectively outputting the N pieces of the $i^{th}$-type output data having a same power to N physical antennas, so that each physical antenna combines output data received by the physical antenna and then sends data obtained after the combining;

wherein when the $i^{th}$-type data comprises MIMO user data, and wherein the application further makes the processor and the network side device execute the following instructions:

performing precoding processing on the MIMO user data, to obtain encoded MIMO user data, or performing precoding processing on the MIMO user data and third-type pilot information, to obtain the encoded MIMO user data; and combining the encoded MIMO user data, second-type pilot information, and the third-type pilot information, to obtain the MIMO data, wherein the second-type pilot information is channel estimation pilot information used by a terminal to perform channel estimation, and the third-type pilot information is data demodulation pilot information used by the terminal to demodulate the MIMO user data; and wherein the process executed by the processor of performing $i^{th}$ linear transformation processing on $i^{th}$-type data comprises an instruction of: performing linear transformation processing on the MIMO data, to obtain N pieces of MIMO output data having a same power.

8. The network side device according to claim 7, wherein a quantity of pieces of the second-type pilot information is the same as an order quantity of the $i^{th}$-type data, and a quantity of pieces of the third-type pilot information is the same as the order quantity of the $i^{th}$-type data.

9. The network side device according to claim 7, wherein when M is 2, the process executed by the processor of performing $i^{th}$ linear transformation processing on $i^{th}$-type comprises the following instructions:

performing first linear transformation processing on first-type data, to obtain N pieces of first-type output data having a same power; and performing second linear transformation processing on second-type data, to obtain N pieces of second-type output data having a same power.

10. The network side device according to claim 7, wherein when M is 3, the process executed by the processor of performing $i^{th}$ linear transformation processing on $i^{th}$-type data comprises the following instructions:

performing first linear transformation processing on first-type data, to obtain N pieces of first-type output data having a same power;

performing second linear transformation processing on second-type data, to obtain N pieces of second-type output data having a same power; and performing third linear transformation processing on third-type data, to obtain N pieces of third-type output data having a same power.

11. The network side device according to claim 7, wherein when M is 3, the process executed by the processor of performing $i^{th}$ linear transformation processing on $i^{th}$-type data comprises the following instructions:

performing first linear transformation processing on first-type data, to obtain P pieces of first-type output data having a same power, wherein P is an order quantity of second-type data;

performing second linear transformation processing on the second-type data, to obtain P pieces of second-type output data having a same power;

combining the P pieces of first-type output data having a same power and the P pieces of second-type output data having a same power, and performing fourth linear transformation processing, to obtain N pieces of first hybrid output data having a same power; and performing third linear transformation processing on third-type data, to obtain N pieces of third-type output data having a same power.

12. The network side device according to claim 11, wherein the process executed by the processor of respectively outputting M types of N pieces of the $i^{th}$-type output data having a same power to N physical antennas comprises the following instructions:

outputting the N pieces of first hybrid output data having a same power to the N physical antennas, and outputting the N pieces of third-type output data having a same power to the N physical antennas.

13. A system for sending data in hybrid networking, comprising a network side device and N physical antennas, wherein the network side device comprises:

a processor;

a memory; and an application physically stored in the memory, wherein the application comprises instructions that uses to make the processor and the network side device execute the following processes:

determining an order quantity N of highest-order multiple-input multiple-output (MIMO) data in hybrid networking and a quantity M of data types in the hybrid networking, wherein N is an even number not less than 2, and M is a natural number not less than 2;

performing $i^{th}$ linear transformation processing on $i^{th}$-type data among the M types of data, to obtain N pieces of $i^{th}$-type output data having a same power, wherein i is a natural number less than or equal to M; and respectively outputting the N pieces of $i^{th}$-type output data having a same power to the N physical antennas, so that each physical antenna combines output data received by the physical antenna and then sends data obtained after the combining;

wherein when M is 3, the process executed by the processor of performing $i^{th}$ linear transformation processing on $i^{th}$-type comprises the following instructions:

performing first linear transformation processing on first-type data, to obtain P pieces of first-type output data having a same power, wherein P is an order quantity of second-type data;

performing second linear transformation processing on the second-type data, to obtain P pieces of second-type output data having a same power;

combining the P pieces of first-type output data having a same power and the P pieces of second-type output data having a same power, and performing fourth linear transformation processing, to obtain N pieces of first hybrid output data having a same power; and performing third linear transformation processing on third-type data, to obtain N pieces of third-type output data having a same power.

14. The system according to claim 13, wherein when the $i^{th}$-type data comprises non-MIMO user data, and wherein the application further makes the processor and the network side device execute the following instruction: combining the non-MIMO user data and first-type pilot information, to obtain non-MIMO data, wherein the first-type pilot information is a primary common pilot channel (P-CPICH), and the first-type pilot information is used by a terminal to perform channel estimation and demodulate the non-MIMO data; and the process executed by the processor of performing $i^{th}$ linear transformation processing on $i^{th}$-type data comprises an instruction of: performing linear transformation processing on the non-MIMO data obtained after the combining, to obtain N pieces of non-MIMO output data having a same power.

15. The system according to claim 13, further comprising a terminal, wherein:

when the $i^{th}$-type data comprises MIMO user data, the application further makes the processor and the network side device execute the following instructions:

performing precoding processing on the MIMO user data, to obtain encoded MIMO user data, or performing precoding processing on the MIMO user data and third-type pilot information, to obtain the encoded MIMO user data; and combining the encoded MIMO user data, second-type pilot information, and the third-type pilot information, to obtain MIMO data, wherein the second-type pilot information is channel estimation pilot information used by the terminal to perform channel estimation, and the third-type pilot information is data demodulation pilot information used by the terminal to demodulate the MIMO user data; and the process executed by the processor of performing $i^{th}$ linear transformation processing on $i^{th}$-type data comprises an instruction of: performing linear transformation processing on the MIMO data, to obtain N pieces of MIMO output data having a same power.

16. A method for sending data in hybrid networking, wherein the method comprises:

determining an order quantity N of highest-order multiple-input multiple-output (MIMO) data in hybrid networking and a quantity M of data types in the hybrid networking, wherein N is an even number not less than 2, and M is a natural number not less than 2;

performing $i^{th}$ linear transformation processing on $i^{th}$-type data among the M types of data, to obtain N pieces of $i^{th}$-type output data having a same power, wherein i is a natural number less than or equal to M; and respectively outputting the N pieces of the $i^{th}$-type output data having a same power to N physical antennas, so that each physical antenna combines output data received by the physical antenna and then sends data obtained after the combining;

wherein when M is 3, the performing $i^{th}$ linear transformation processing on $i^{th}$-type data comprises:

performing first linear transformation processing on first-type data, to obtain N pieces of first-type output data having a same power;

performing second linear transformation processing on second-type data, to obtain N pieces of second-type output data having a same power; and performing third linear transformation processing on third-type data, to obtain N pieces of third-type output data having a same power.

17. A method for sending data in hybrid networking, wherein the method comprises:

determining an order quantity N of highest-order multiple-input multiple-output (MIMO) data in hybrid networking and a quantity M of data types in the hybrid networking, wherein N is an even number not less than 2, and M is a natural number not less than 2;

performing $i^{th}$ linear transformation processing on $i^{th}$-type data among the M types of data, to obtain N pieces of $i^{th}$-type output data having a same power, wherein i is a natural number less than or equal to M; and respectively outputting the N pieces of the $i^{th}$-type output data having a same power to N physical antennas, so that each physical antenna combines output data received by the physical antenna and then sends data obtained after the combining;

wherein when M is 3, the performing $i^{th}$ linear transformation processing on $i^{th}$-type data comprises:

performing first linear transformation processing on first-type data, to obtain P pieces of first-type output data having a same power, wherein P is an order quantity of second-type data;

performing second linear transformation processing on the second-type data, to obtain P pieces of second-type output data having a same power;

combining the P pieces of first-type output data having a same power and the P pieces of second-type output data having a same power, and performing fourth linear transformation processing, to obtain N pieces of first hybrid output data having a same power; and performing third linear transformation processing on third-type data, to obtain N pieces of third-type output data having a same power.

18. A network side device, wherein the network side device comprises:

a processor;

a network interface;

a memory; and an application physically stored in the memory, wherein the application comprises instructions that uses to make the processor and the network side device execute the following processes:

determining an order quantity N of highest-order multiple-input multiple-output (MIMO) data in hybrid networking and a quantity M of data types in the hybrid networking, wherein N is an even number not less than 2, and M is a natural number not less than 2;

performing $i^{th}$ linear transformation processing on $i^{th}$-type data among the M types of data, to obtain N pieces of $i^{th}$-type output data having a same power, wherein i is a natural number less than or equal to M; and respectively outputting the N pieces of the $i^{th}$-type output data having a same power to N physical antennas, so that each physical antenna combines output data received by the physical antenna and then sends data obtained after the combining;

wherein when M is 3, the process executed by the processor of performing $i^{th}$ linear transformation processing on $i^{th}$-type data comprises the following instructions:

performing first linear transformation processing on first-type data, to obtain N pieces of first-type output data having a same power;

performing second linear transformation processing on second-type data, to obtain N pieces of second-type output data having a same power; and performing third linear transformation processing on third-type data, to obtain N pieces of third-type output data having a same power.

19. A network side device, wherein the network side device comprises:

a processor;
a network interface;
a memory; and
an application physically stored in the memory, wherein the application comprises instructions that uses to make the processor and the network side device execute the following processes:

determining an order quantity N of highest-order multiple-input multiple-output (MIMO) data in hybrid networking and a quantity M of data types in the hybrid networking, wherein N is an even number not less than 2, and M is a natural number not less than 2;

performing $i^{th}$ linear transformation processing on $i^{th}$-type data among the M types of data, to obtain N pieces of $i^{th}$-type output data having a same power, wherein i is a natural number less than or equal to M; and respectively outputting the N pieces of the $i^{th}$-type output data having a same power to N physical antennas, so that each physical antenna combines output data received by the physical antenna and then sends data obtained after the combining;

wherein when M is 3, the process executed by the processor of performing $i^{th}$ linear transformation processing on $i^{th}$-type data comprises the following instructions:

performing first linear transformation processing on first-type data, to obtain P pieces of first-type output data having a same power, wherein P is an order quantity of second-type data;

performing second linear transformation processing on the second-type data, to obtain P pieces of second-type output data having a same power;

combining the P pieces of first-type output data having a same power and the P pieces of second-type output data having a same power, and performing fourth linear transformation processing, to obtain N pieces of first hybrid output data having a same power; and performing third linear transformation processing on third-type data, to obtain N pieces of third-type output data having a same power.

20. A system for sending data in hybrid networking, comprising a network side device and N physical antennas, wherein the network side device comprises:

a processor;
a memory; and
an application physically stored in the memory, wherein the application comprises instructions that uses to make the processor and the network side device execute the following processes:

determining an order quantity N of highest-order multiple-input multiple-output (MIMO) data in hybrid networking and a quantity M of data types in the hybrid networking, wherein N is an even number not less than 2, and M is a natural number not less than 2;

performing $i^{th}$ linear transformation processing on $i^{th}$-type data among the M types of data, to obtain N pieces of $i^{th}$-type output data having a same power, wherein i is a natural number less than or equal to M; and respectively outputting the N pieces of $i^{th}$-type output data having a same power to the N physical antennas, so that each physical antenna combines output data received by the physical antenna and then sends data obtained after the combining; and a terminal, wherein:

when the $i^{th}$-type data comprises MIMO user data, the application further makes the processor and the network side device execute the following instructions:

performing precoding processing on the MIMO user data, to obtain encoded MIMO user data, or performing precoding processing on the MIMO user data and third-type pilot information, to obtain the encoded MIMO user data; and combining the encoded MIMO user data, second-type pilot information, and the third-type pilot information, to obtain the MIMO data, wherein the second-type pilot information is channel estimation pilot information used by the terminal to perform channel estimation, and the third-type pilot information is data demodulation pilot information used by the terminal to demodulate the MIMO user data; and the process executed by the processor of performing $i^{th}$ linear transformation processing on $i^{th}$-type data comprises an instruction of: performing linear transformation processing on the MIMO data, to obtain N pieces of MIMO output data having a same power.

* * * * *